United States Patent

Groat et al.

[15] 3,641,813

[45] Feb. 15, 1972

[54] STATIC TORQUE-TESTING DEVICE

[72] Inventors: Craig R. Groat, Pontiac; Manfred R. Happold, Farmington, both of Mich.

[73] Assignee: Link Engineering Company

[22] Filed: Apr. 13, 1970

[21] Appl. No.: 27,638

[52] U.S. Cl. ................................................................73/121
[51] Int. Cl. ............................................................G01l 5/28
[58] Field of Search.....................73/136, 121, 123, 126, 168, 73/115

[56] References Cited

UNITED STATES PATENTS

| | | | |
|---|---|---|---|
| 1,511,574 | 10/1924 | Mortsell | 73/115 |
| 1,872,123 | 8/1932 | Cowdrey | 73/126 |
| 2,024,147 | 12/1935 | Curtiss | 73/143 |

*Primary Examiner*—Jerry W. Myracle
*Attorney*—Harness, Dickey & Pierce

[57] ABSTRACT

After a stack of brake discs have been set to break the landing speed of an airplane or other vehicle, a test on the brake material is desired to find the break-way force for releasing the rotor and stator discs to permit the airplane or vehicle to be driven thereafter. To obtain this information, a drive is provided on the brake disc test device for applying a load on the brake discs when set which is constantly increased until free movement of the rotor discs occurs relative to the stator discs. A fluid motor drives through a worm wheel for applying the load on the rotor discs, the increasing applied fluid pressure providing a load record, while a torque arm on the tailstock which supports the testing device registers the load being applied through the stack of brake discs. The pressure on the fluid required to release the rotor and stator discs of the stack can be compared to the force recorded by the torque arm at the time of release.

10 Claims, 3 Drawing Figures

INVENTORS.
Craig R. Groat
Manfred R. Happold
BY
Harness, Dickey & Pierce
ATTORNEYS.

INVENTORS
Craig R. Groat
Manfred R. Happold
BY
Harness, Dickey & Pierce
ATTORNEYS.

STATIC TORQUE-TESTING DEVICE

BACKGROUND OF THE INVENTION

In the related application of C. R. Groat et al., Ser. No. 25,313, filed Apr. 3, 1970, for a "Testing Device For Brakes and Brake Material" assigned to the assignee of the present invention, a disclosure is found of a pressure-applying device for a stack of brake discs. The rotor discs are driven while the stator discs are maintained stationary to provide tests for wear, friction and other characteristics of the brake disc and the materials forming the pads thereof. The structure of the present invention is an attachment for the brake material-testing device which obtains break-way data registering the applied load and torque force at the time the stack of brake discs are released.

SUMMARY OF THE INVENTION

The invention pertains to a load-applying device having a central shaft which is connected to the supporting element for the stator discs of the brake disc stack. The shaft is driven by a plate fixed thereto having spaced pin-receiving bushings thereon. A worm wheel is rotatably mounted on the shaft which carries pins which are insertable in the bushings in the driving plate. Advancing and retracting structure for the pins is mounted on a backplate on which spaced air cylinders are mounted, the pistons of which are attached to a pin-advancing and retracting disc. The disc moves the pins forwardly so that when the worm wheel is initially driven, the pins when aligned with the bushing will be inserted therein to connect the driven plate to the worm wheel to be driven thereby. A worm is meshed with the worm wheel and is driven by a fluid motor, the fluid pressure of which is recorded as it builds up to apply an increasing force through the worm and worm wheel to the stub shaft and support for the stator disc of the disc stack to be released. As the fluid pressure increases, a torque is applied to the stator discs and to a torque arm on the stator disc-supporting element which records the amount of torque being applied to the disc stack. A substantial load is built up between the worm and worm wheel and a reservoir encompasses the worm, the thread of which is emersed in a special lubricant made up of graphite and a selected oil which will reduce friction and wear between the thread and worm wheel teeth. A special lubricant is also provided on the bearing between the worm wheel and a stationary flanged bearing sleeve.

DESCRIPTION OF THE PREFERRED EMBODIMENT

Figure 1:
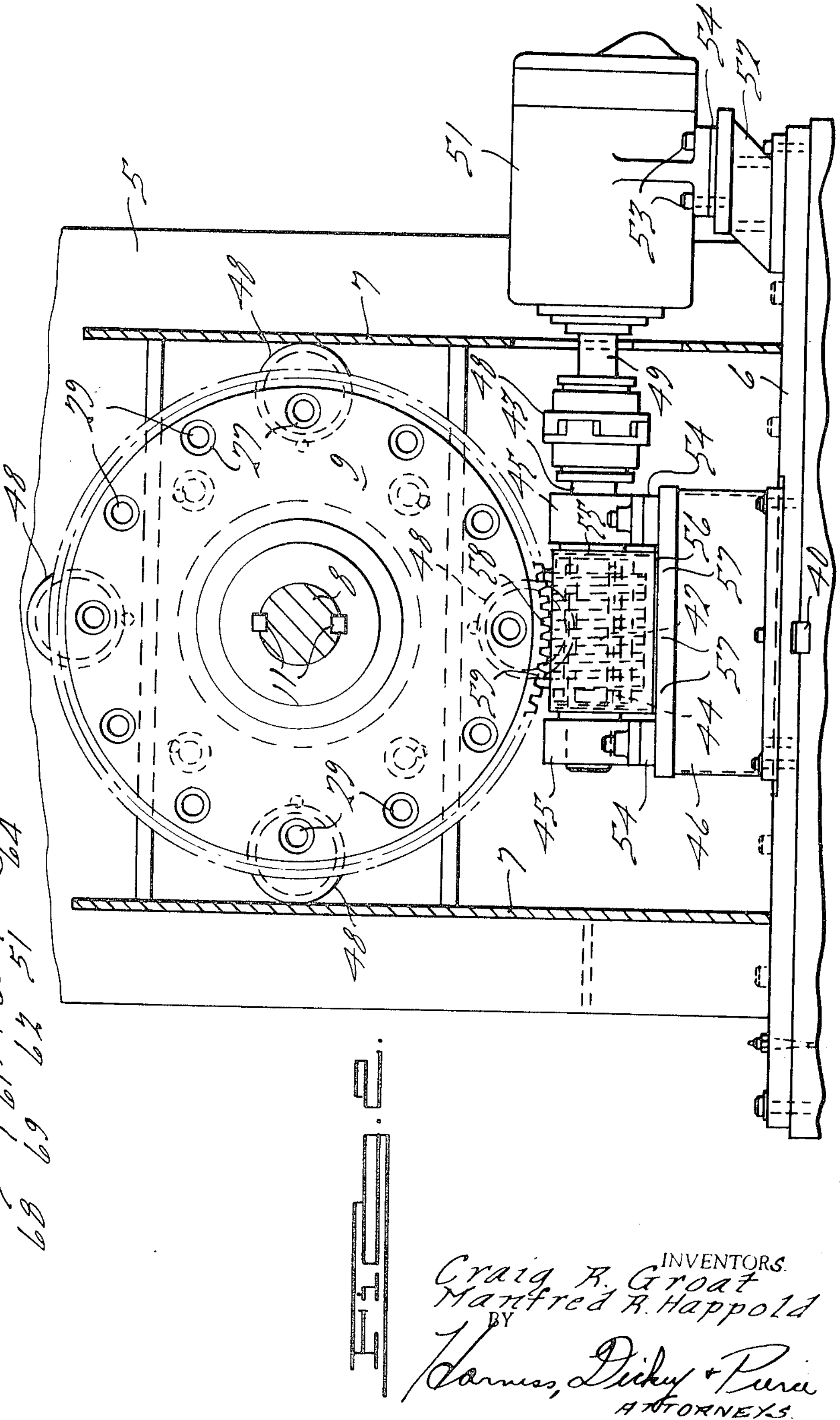
FIG. 1 is a schematic view of a brake disc-testing device embodying the present invention.
Figure 2:
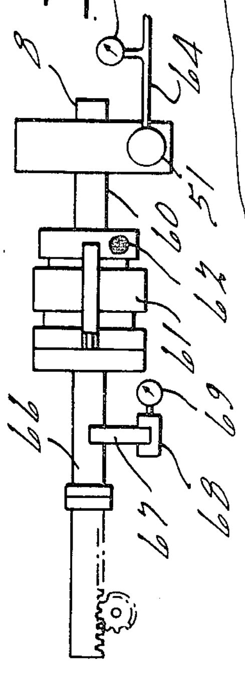
FIG. 2 is a broken sectional view in elevation of the device of the present invention.

A backplate 5 extends upwardly from a baseplate 6 reinforced by a pair of sideplates 7. The backplate 5 has a heavy shaft 8 extending therethrough for supporting a drive plate 9 secured thereto by a pair of keys 11. A flanged sleeve 12 is secured to the plate 5 by a plurality of screws 13. A flanged bronze sleeve 15 has an annular recess 16 for a lubricant and an extending flange 17 which engages a hub 18 on a worm wheel adapter 19 in fixed relation thereto. The opposite end of the sleeve 15 engages a retainer ring 21 secured on the end of the sleeve 12 by a plurality of screws 22. A worm wheel disc 23 is secured to the adapter 19 by a plurality of screws 24 and a lubricating fitting 25 is threaded into the hub 18 and joined by a passageway 26 through the hub 18 and sleeve 15 to the annular recess 16. The drive plate 9 has a plurality of sleeve bushings 27 mounted therein disposed equally angular distances apart and herein illustrated as being 12 in number. Spaced bearing sleeves 28 are provided in the worm wheel disc 23 aligned with the bushings 27 for supporting reciprocal pins 29.

Figure 3:
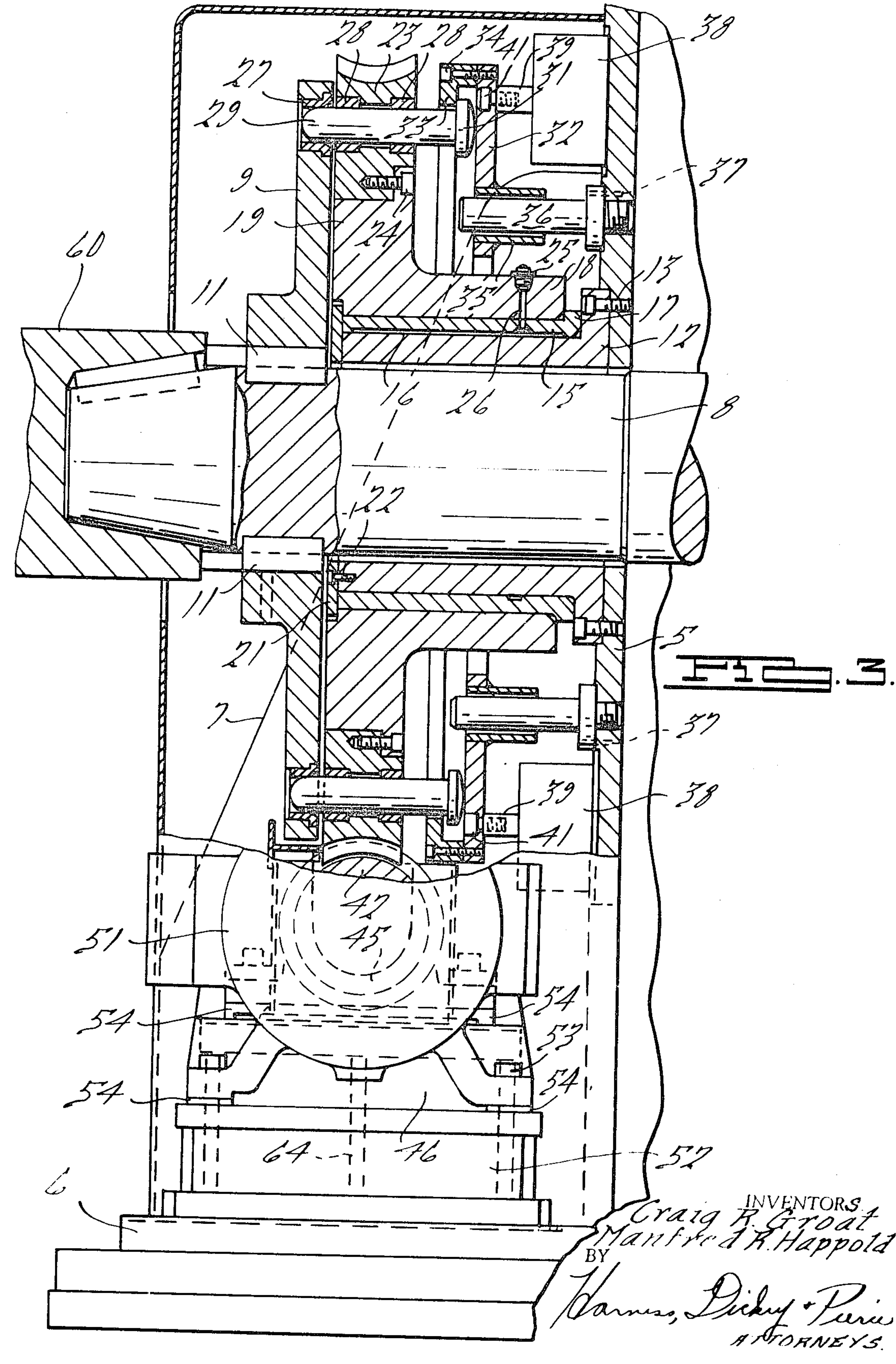
FIG. 3 is a broken sectional end view of the structure illustrated in FIG. 2, as viewed from the right-hand end thereof.

The pins have a head 31 on the outer end which are trapped between a washerlike plate 32 and a flanged ring 33 secured thereto at the outer edge thereof by a plurality of screws 34. The plate 32 has bearing sleeves 35 extending therethrough herein illustrated as being four in number. The sleeves slide on guideposts 36 which are threaded into the plate 5 and are secured against rotation by spring pins 37. Air cylinders 38, herein being illustrated as four in number, have their piston rod 39 secured to the plate 32 by a screw 41. The advancement and retraction of the piston rods 39 advances and retracts the pins 29 into and from the bushings 27. When the pins are in a retracted position by the movement of the plate 32 and flange 33 away from the worm wheel 23 and the movement of the piston rods 39 into the cylinders 38, the worm wheel 23 may be driven without driving the drive plate 9. Where the drive connection is desired, the cylinders 38 are energized and the plate 32 and flange 33 move toward the worm wheel 23 to have the rounded end of the pins 29 engage the adjacent face of the driving plate 9 upon the driving of the worm wheel by a worm 42. The pins will advance until they become aligned with a bushing 27 after which they will be moved therein to the position illustrated in FIG. 3.

The worm 42 is secured to a shaft 43 by a pair of keys 44 and supported in pillow blocks 45 on a riser 46 secured to the base 6 and aligned therewith by a key 40. A connector 48 joins the shaft 43 to a shaft 49 of a fluid motor 51 secured to a support 52 by screws 53. Plates 54 beneath the worm and motor are ground on assembly to assure the alignment of the shafts 43 and 49. The lubricant container 55 through which the shaft 43 extends is of rectangular form and is secured by bolts (not shown) to the riser 46. The special lubricant in the container 55 is made from a compound of graphite and a selected oil to properly lubricate a thread 58 of the worm which extends thereinto.

Referring more particularly to FIG. 1, a testing device 61 for a stack of disc brakes 62 and the material forming the pads thereof is similar to that of the above-mentioned application. The device 63 of the present invention is attached to a shaft 60 thereof to obtain breakaway pressure and torque reading for releasing the brake pads. The motor 51 has fluid under pressure delivered thereto from a conduit 64 after air has been applied to the cylinders 48 for urging the pins 29 toward the drive plate 9. Upon the initial movement of the worm wheel 23, the pins 29 will be moved into the sleeves 27 thereby connecting the worm wheel with the drive plate. The worm wheel will attempt to drive the shaft 8 and will be slowly actuated to increase the force on the shaft to attempt to break away the stator discs from the rotor discs. The test device 61 and tailstock 66 will resist the force in torsion which will be registered by an arm 67 on a pressure pad or other force-measuring device 68 on a gauge 69. Fluid will continue to build up in the motor 51 and apply more and more force for driving the worm wheel 23 and will be recorded on a gauge 70 until a breakaway occurs thereby providing fluid pressure and torque readings for the test up to the breakaway point. This will give the load requirement for an airplane or other vehicle after the force has been removed from the brake discs to move the airplane or other vehicle after it has been stopped.

What is claimed is:

1. In a torque-testing device, a supporting frame, a rotatable shaft supported by said frame, a drive plate secured to said shaft, a worm wheel mounted for free rotation about said shaft, disengageable coupling means between said worm wheel and drive plate, means for actuating said coupling means to engaged position for driving said shaft and to disengaged position for releasing said shaft, and a worm for driving said worm wheel.

2. In a torque-testing device as recited in claim 1, wherein a fluid rotary motor drives said worm, the pressure of the fluid of which is proportional to the applied torque.

3. In a torque-testing device as recited in claim 2, wherein the shaft drives a member under torque load.

4. In a torque-testing device as recited in claim 3, wherein a torque arm is mounted on said member driven by said shaft, and load-reading means engaged by the torque arm.

5. In a torque-testing device as recited in claim 4, wherein gauging means is provided for recording the pressure on the fluid supplied to the motor which can be compared to the load-reading means engaged by the torque arm.

6. In a torque-testing device as recited in claim 1, wherein a lubricating container encompasses the worm for lubricating the thread thereof and the teeth of the worm wheel, the worm wheel being located above the container.

7. In a torque-testing device as recited in claim 6, wherein the lubricant is a mixture of graphite and a selected oil which is readily carried by the worm.

8. In a torque-testing device as recited in claim 1, wherein the coupling means embodies a plurality of headed pins carried by the worm wheel and wherein bushings are provided in the drive plate alignable with the pins, said means for operating said coupling means advancing and retracting said pins.

9. In a torque-testing device as recited in claim 8, wherein said advancing and retracting means is a plate carrying a spaced flange encompassing the heads of the pins, fixed posts on which said flanged plate is advanced and retracted, and air cylinder means engaging the flanged plate for moving it in either direction.

10. In a torque-testing device as recited in claim 1, wherein the worm wheel has a sleevelike hub, a sleeve within the hub secured to the support, a bearing secured within said hub, and a fitting on said hub through which a lubricant is supplied to said bearing and sleeve.

* * * * *